US006345310B1

United States Patent
Allison et al.

(10) Patent No.: US 6,345,310 B1
(45) Date of Patent: Feb. 5, 2002

(54) ARCHITECTURE FOR A MULTIPLE PORT ADAPTER HAVING A SINGLE MEDIA ACCESS CONTROL (MAC) WITH A SINGLE I/O PORT

(75) Inventors: Samuel Steven Allison, Fuquay-Varina; Kenneth James Barker, Cary, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/123,547

(22) Filed: Jul. 28, 1998

(51) Int. Cl.[7] ............................................. H04L 12/413
(52) U.S. Cl. ........................ 709/250; 370/463; 710/2
(58) Field of Search ..................... 709/250; 370/463, 370/401, 402, 445, 442, 443; 710/2

(56) References Cited

U.S. PATENT DOCUMENTS

| | | | |
|---|---|---|---|
| 4,486,880 A | | 12/1984 | Jeffrey et al. |
| 4,656,620 A | | 4/1987 | Cox |
| 5,121,390 A | | 6/1992 | Farrell et al. |
| 5,182,800 A | | 1/1993 | Farrell et al. |
| 5,218,680 A | | 6/1993 | Farrell et al. |
| 5,568,476 A | | 10/1996 | Sherer et al. |
| 5,594,367 A | | 1/1997 | Trimberger et al. |
| 5,625,563 A | | 4/1997 | Rostoker et al. |
| 5,646,555 A | | 7/1997 | Morinaka |
| 5,995,514 A | * | 11/1999 | Lo ............................... 370/463 |
| 6,061,362 A | * | 5/2000 | Muller et al. ................ 370/463 |
| 6,094,439 A | * | 7/2000 | Krishna et al. .............. 370/445 |
| 6,108,713 A | * | 8/2000 | Sambamurthy et al. ...... 709/250 |
| 6,137,807 A | * | 10/2000 | Rusu et al. .................. 370/429 |
| 6,181,708 B1 | * | 1/2001 | Quackenbush et al. ...... 370/445 |

* cited by examiner

*Primary Examiner*—Dung C. Dinh
(74) *Attorney, Agent, or Firm*—Morgan & Finnegan, LLP

(57) ABSTRACT

A multiple port adapter having a single MAC chip with a single I/O port has reduced logic circuits and I/O pins for transferring data between a host system and a TDM communication system. The MAC chip includes a transmit MAC and a receive MAC, each coupled at one end through the single I/O port to a port multiplexer and at the other end to respective storage registers. The port multiplexer is coupled to each port. Transmit and receive state registers track the state of each port in the transfer of data in the transmit and receive directions through the single I/O port. The storage registers are coupled through a host bus interface to a host bus and to the host system. Control logic is coupled to the storage register to control the transfer of data between the system and the storage registers. A port selector coupled between the multiplexer and the transmit and receive state registers selects ports for transfer of data in succession. On each chip clock cycle, the port selector selects a state machine register to determine the state of the MACs for processing the data and a section of the FIFO's to write or read data for the selected port. At the end of the cycle, the state registers are set and stay set until selected again. The process repeats for each port in a cyclic manner. Once data is accumulated in the receive storage register, control logic reads the data of the host bus. Once space is available in the transmit storage register, the control logic writes data from the host system to the transmit storage register.

20 Claims, 7 Drawing Sheets

Multi-Port Implemtation with MAC and I/O Port

Tx MII State Diagram

RxMII State Machine

Tx MAC State Machine

Rx MAC State Machine

ARCHITECTURE FOR A MULTIPLE PORT ADAPTER HAVING A SINGLE MEDIA ACCESS CONTROL (MAC) WITH A SINGLE I/O PORT

CROSS REFERENCE

This application is related to Ser. No. 09/123,899 pending, entitled "ARCHITECTURE FOR A MULTI-PORT ADAPTER WITH A SINGLE MEDIA ACCESS CONTROL (MAC)," filed concurrently on Jul. 28, 1998 as assigned to the same assignee as that of the present invention.

BACKGROUND OF INVENTION

1. Field of the Invention

This invention relates to communication systems. More particularly, this invention relates to a multiple port adapter having a single MAC with a single I/O port serving all ports.

2. Description of Prior Art

Increasingly in communication systems, more and more attachment devices, e.g., telephones, fax machines, modems, etc., are coupled to a host system through a multi-port adapter usually having 24 to 32 ports and fabricated in a single Very Large Scale Integrated (VLSI) chip. Each port attaches to a Physical Layer of a communication channel and is further coupled to a Media Access Control (MAC) Unit in an adapter functioning in the Open Systems Interconnect (OSI) architecture. In one prior art embodiment, each port is serviced by an adapter chip including a single MAC unit. In another prior art embodiment, multiple copies of a single MAC design are replicated in a VSLI chip to serve the respective ports. Multiple copies of the MAC unit result in a large number of gates, hence a high cost for the chip. Moreover, MAC's designed to operate at either 10 mbps or 100 mbps use only 10% of their capability when running in the 10 mbps mode. Accordingly, a single MAC may service either one 100 mbps or 8–10 mbps ports further contributing to a large number of gates.

What is needed is a multi-port adapter fabricated as a chip having a reduced number of gates and I/O pins. Lowering the gate count reduces the cost of the chip both when it is a stand alone chip and when it is a macro integrated into a larger chip. Lowering the pin count for the chip reduces the package cost of the module incorporating the chip.

Prior art related to multi-port adapters includes the following:

U.S. Pat. No. 5,568,476 issued Oct. 22, 1996, discloses a single MAC serving multiple ports using a transmit MAC, a transmit buffer, a receive MAC, a receive buffer, a control logic for reserving storage in the buffer for transmitted and received data.

U.S. Pat. No. 5,121,390 issued Jun. 9, 1992, discloses a single chip integrated data link control device having transmit and receive paths between time channels on a high TDM data link in a host processing system for ISDN application.

U.S. Pat. No. 5,625,563 issued Apr. 29, 1997, discloses serial high speed interconnect devices integrated in semiconductor devices to reduce the number of I/O pins required for communication and control between a plurality of semiconductor devices.

U.S. Pat. No. 5,594,367 issued Jan. 14, 1997 discloses an input/output circuit within an integrated circuit, the output signal driving circuitry contains a dedicated multiplexer on the output path wherein a first and second output signal can be time multiplexed on single output pad which effectively doubles number of if output signals the integrated circuit can provide with a given number of pads.

U.S. Pat. No. 4,656,620 issued Apr. 7, 1987 discloses a logic array circuit providing outputs which are time multiplexed to provide a serial output to reduce pin count of circuit modules in a large digital system.

U.S. Pat. No. 4,486,880 issued Dec. 4, 1984 discloses an output multiplexer having a plurality of inputs and responsive to a select circuit for determining the multiplexer output.

None of the prior art discloses a multiple port adapter having a single MAC with a single I/O output port coupled to a multiplexer in a Physical Layer chip serving multiple ports coupled to individual channels in a Time Division Multiplex (TDM) communication network to reduce chip logic gates an I/O pins.

SUMMARY OF THE INVENTION

An object of the invention is an architecture for an adapter having a single Media Access Control (MAC) with a single I/O output port in a multiple port adapter.

Another object is an adapter having a single MAC with a single I/O output port and a Physical Layer device serving multiple ports in a communication network.

Another object is an adapter having a single MAC with a single I/O output port coupled to a multiplexer in a Physical Layer serving multiple port coupled to a TDM network.

Another object is an adapter and method of operation having a single MAC with a single output port coupled to a multiplexer for reduced MAC circuit count and output pins.

These and other objects, features and advantages are achieved in a single MAC coupled between a host system and a time division, multi-channel network. The single MAC has a single I/O port and includes a transmit MAC and a receive MAC path. Each path is coupled at one end to the I/O pins and at the other end to separate transmit and receive storage (FIFO) devices. A transmit state machine is coupled to the transmit MAC and transmit FIFO. A receive state machine is coupled to the receive MAC and receive FIFO. Each FIFO is coupled to a host interface and provides instructions to control logic for transmitting and receiving data between the host system and the network. A port selector is coupled to the multiplexer and to the transmit and receive state machines for selecting each port on a cyclic basis to transmit and receive data. Each state machine contains a state table having a one word entry for each port to track the status of the port. The I/O pins are coupled to a Physical Layer containing a multiplexer connected to each port serving a channel in the network through a Media Independent register. As the ports are selected by the port selector, the associated word for a port is read from the table and used to control the state machine in servicing the port. The port selector also assigns a section in the FIFO's for storing data processed or to be processed by the MACs. The transmit and receive state machines operate concurrently and determine the MAC state for servicing the port, after which the MAC state is updated and stored back into the state table. In the receive direction, the ports are serviced in a round robin fashion. In the transmit direction, data is written into the transmit FIFO as space becomes available. Control Logic means controls the transfer of data between the host system and the network and vice-a-versa when instructed by the FIFOs. The chip architecture is extendable from 10 mbps to 100 mbps and reduces the I/O pin count for the adapter and the MAC chip logic by approximately 75% compared to prior art devices.

DESCRIPTION OF THE DRAWINGS

The invention will be further understood from a detailed description of a preferred embodiment taken in conjunction with the appended drawing, in which.

DESCRIPTION OF A PREFERRED EMBODIMENT

Figure 1:
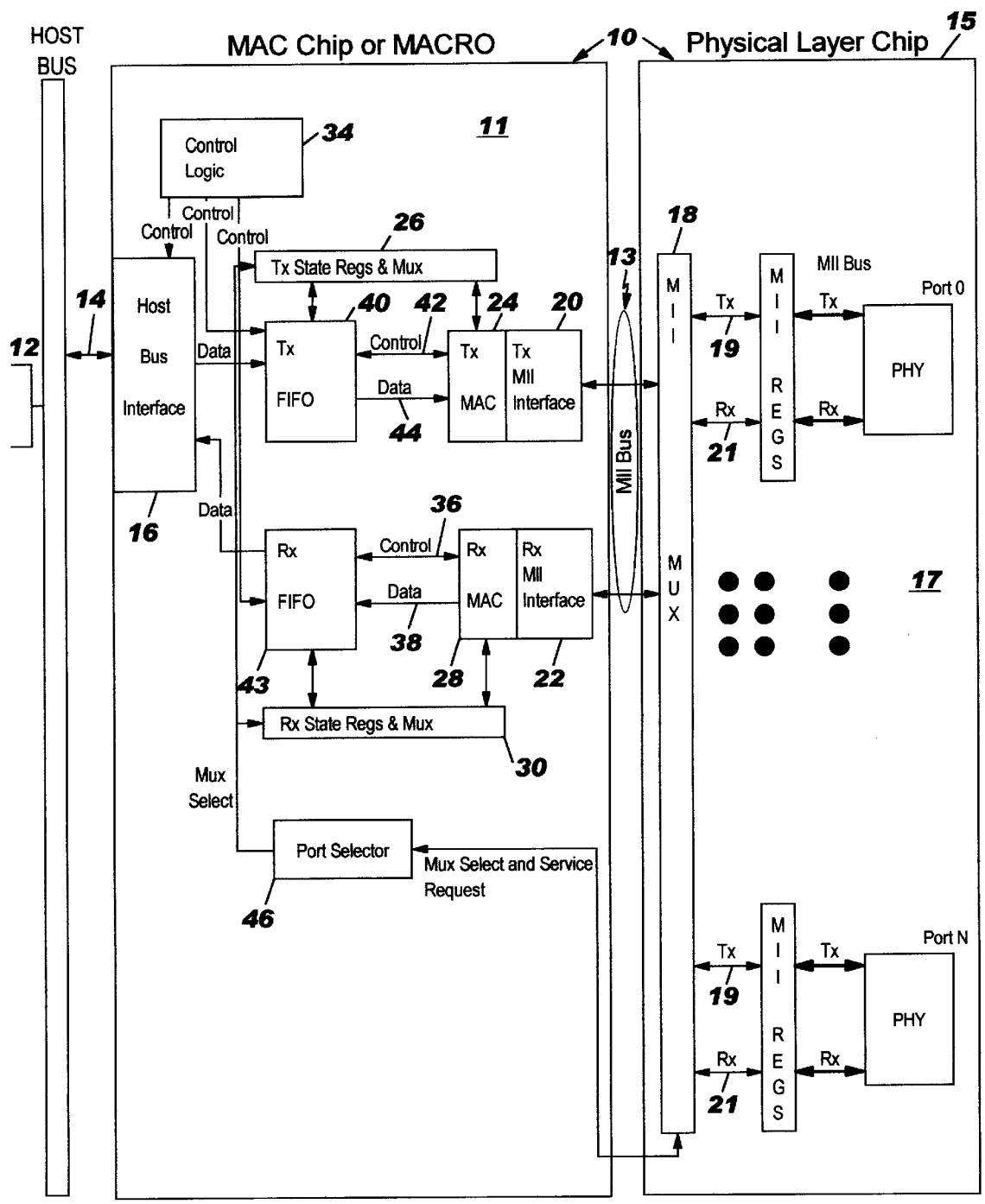
FIG. 1 is a block diagram of an adapter having a single MAC with a single I/O port coupled to a multiplexer in a Physical Layer chip serving a multi-channel communications system using TDM and incorporating the principles of the present invention.

In FIG. 1, an adapter 10 includes a single Media Access Control (MAC) device or chip 11 having a single I/O port 13 and a Physical Layer device or chip 15. The MAC is coupled between a host system 12 and through the Physical layer device to a communications network 17 having multiple channels. The host system is coupled to the adapter 10 through a host bus 14 and a host bus interface 16. The communication network operates on a TDM basis and each channel is connected to an individual port 0–N in the adapter through the Physical Layer chip 15 in the Open System Interconnect (OSI) architecture. The physical layer chip 15 contains a multiplexer 18 coupled to Media Independent Interface registers $20^0$ ... $20n$ through transmit path (Tx) 19 and receive path (Rx) 21. Each register $20^0$ ... $20n$ serve an individual port 0 ... N coupled to a channel of the network.

The multiplexer 18 is key to allowing a single MAC to support multiple ports. The registers are divided into those located in the port's transmit path 19 and those located in the port's receive path 21. The registers located in the transmit path 19 are multiplexed to a transmit interface (TxMII) 20 while the receive registers are demultiplexed through a receive interface (RxMII) 22. To match the speed and asynchronous nature of the network clocks and the internal MAC clock there is data buffering in the multiplexer. In the transmit direction there are three bytes of buffer for each port and two bytes of buffer per port in the receive direction.

The transmit interface 20 (TxMII) is coupled to a transmit MAC 24 (TxMAC) in the transmit path 19. The transmit MAC is coupled to a storage device 40, typically a FIFO (TxFIFO) through control 42 and data 44 lines. The device 40 stores data received from the host interface 16 under control of control logic 34. A transmit state register and multiplexer 26 exchanges data with interface 20, the MAC 24 and the storage device 40 under the control of a port selector 46, as will be described hereinafter.

Similarly, the receive interface (RxMII) 22 is coupled to a receive MAC (RxMAC 28 in the receive path 21 which in turn is coupled to a receive storage device 43, typically a FIFO (RxFIFO) through control 36 and data lines 38. The device 43 stores data received from the host interface 16 under control of the control logic 34. A receive state register and multiplexer 23 exchanges data with the interface 22, the MAC 28 and the storage device 43 under the control of the port selector 46, as will be described hereinafter.

Figure 2:
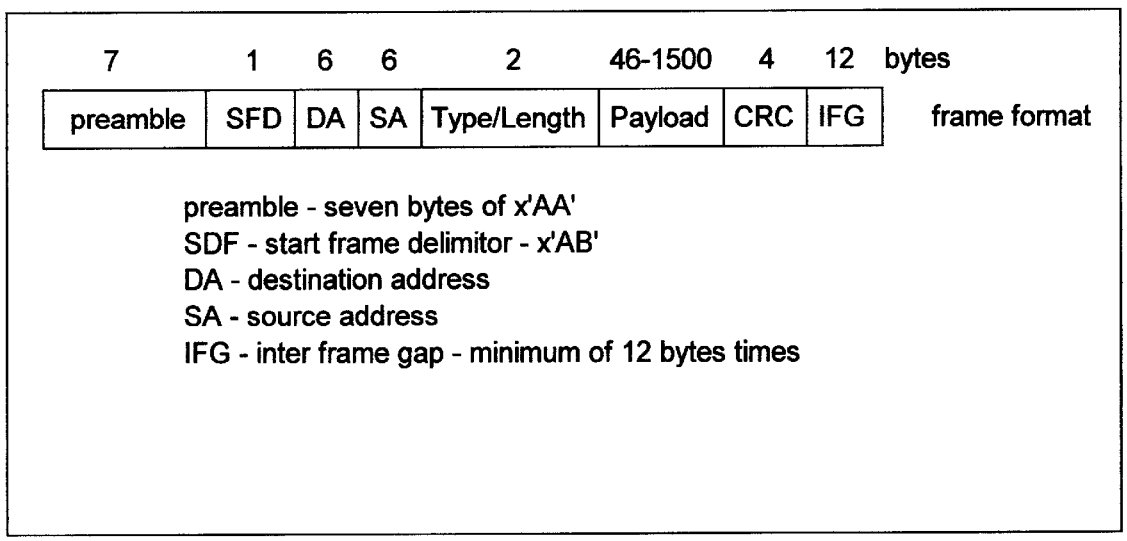
FIG. 2 is a representation of a frame employed in the communication system of FIG. 1.

The transmit interface 20 handles the appropriate media independent protocol for transmitting data in a frame format shown in FIG. 2. Each frame includes a Preamble; a Start Frame Delimiter (SFD); a Destination Address (DA); a Source Address (SA); a Type/Length field for the transmitted data; a data field or payload field; a Cyclic Redundancy Check (CRC) field; and an Inter-Frame Gap (IFG). The number of bytes for each field is specified in FIG. 2.

Figure 3:
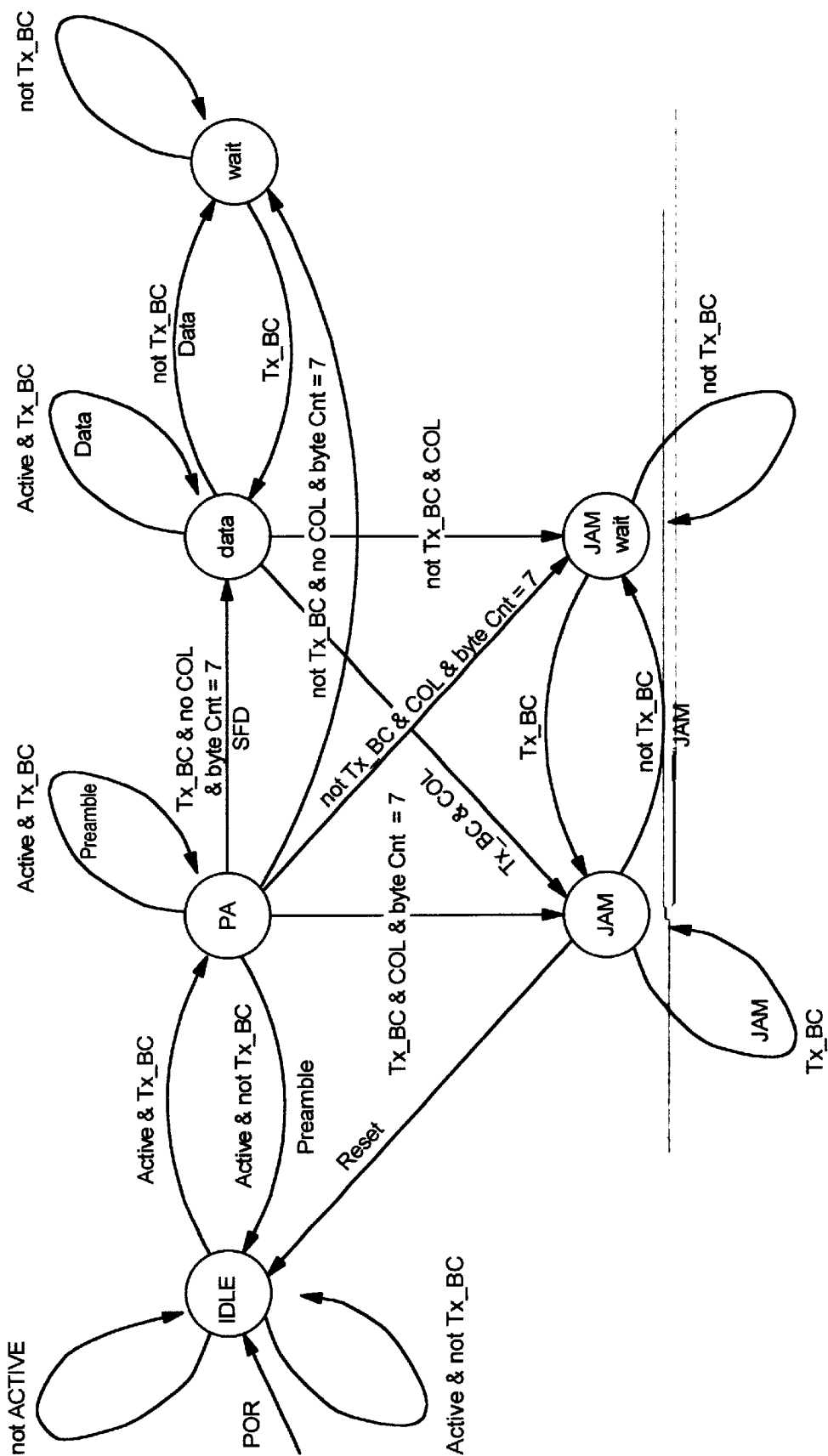
FIG. 3 is a state diagram of a transmit media independent interface (TxMII) included in the multi-port adapter of FIG. 1.

Returning to FIG. 1, the transmit interface 20 transmits the Preamble and Start Frame Delimiter; calculates the frame Cyclic Redundancy Check (CRC) and signals errors to the Physical Layer. The transmit interface 20 interfaces to the multiplexer 18 in such a way that the logic of the interface 18 behaves just as though it were connected directly to the Physical Layer of a channel. In this way the transmit interface 20 is identical to a single port MAC design. In FIG. 3, a state diagram describes the operations of the transmit interface in transmitting the preamble; Start Frame Delimiter; Calculating the Frame CRC; and identifying signaling errors to the physical caller. The multiplexer 18 provides the following signals to the TxMII state machine; COL (collision) which indicates a collision was detected on the media, and Tx_BC is a signal that indicates that the associated PHY layer can accept a byte of data in the TDM time slot. The signal "Active" is a signal from the control logic 34 that indicates that a frame is ready to be transmitted.

TxMII Operation

When the state machine receives a power-on-reset it enters the "IDLE" state. It returns to the "IDLE" state from any other state when it receives a "RESET" (not shown in the figure). The "reset" is generated when a general reset condition is detected or at the end of a frame after all of the frame has been transmitted.

IDLE State

Frame transmission states when the state machine is in the "IDLE" state and the control logic 34 asserts the active signal. The state machine will remain in the "IDLE" state until it receives a signal from the PHY indicating the PHY can accept a byte of information. This ability to accept information is conveyed via the Tx_BC signal. If the PHY is able to accept a byte, the state machine advances to state "PREAMBLE". If the PHY is unable to accept a byte, the state machine remains in the "IDLE" state.

The transmit logic is transmitting the frame preamble when the state machine is in the "PREAMBLE" state. The preamble is 7 bytes in length, thus the check of the length while in the "Preamble" state. Because the signal Tx_BC is an indication that the PHY can accept a byte on the next TDM slot (not the current slot) a preamble byte is not transferred on the transmission from the "IDLE" state to the "Preamble" state. Once in the "Preamble" state the state machine continues to transmit frame preamble bytes until the complete preamble has been transmitted. While in the "Preamble" state, if the PHY indicates that it cannot accept another preamble byte (Tx_BC not active) the state machine will return to the "IDLE" state and wait for TX_BC to become active before continuing to transmit the preamble.

When the complete preamble has been transmitted to the PHY layer, (byte count=7) the state machine will transmit the SFD (Start Frame Delimiter) and move to the "DATA" state. If a media Collision occurs while the state machine is in the "Preamble" state and the PHY is able to accept a frame byte, the state machine will transfer to the "JAM" state. If the PHY cannot accept a frame byte, the state machine will go to the "JAM Wait" state and wait until the PHY is ready to accept more data. If a collision was not detected and the PHY is not ready to accept more data, the state machine will send the SFD and go to the "WAIT" state where it will remain until the PHY can accept more data.

Data State

The "Data" state is where the frame payload is sent to the PHY layer. In general, as long as the PHY can accept data, (Tx_BC active) the state machine will loop in this state until the complete frame has been transmitted. If the PHY cannot accept data on the next TDM cycle (Tx_BC inactive), the state machine will go to the "WAIT" state.

If a collision is detected, and the PHY indicates that it can accept more data on the next cycle, the state machine will go to the "JAM" state and start the "jam" sequence. If the PHY indicates that it cannot accept data on the next TDM cycle, the state machine will go to the "JAM wait" state where it will wait for the PHY to be in a position to accept data before sending the "jam" sequence.

WAIT State

Once the state machine enters the "WAIT" state, it remains there until the PHY indicates that it can accept more data or until a reset is indicated. If the PHY indicates that it can accept more data, the state machine returns to the "DATA" state and continues to transmit the frame. If a reset is detected, the state machine returns to the "IDLE" state and awaits the start of the next frame transmission.

JAM State

While in the "JAM" state, the state machine will cause the "jam" sequence to be transmitted. The "jam" sequence is a 32-bit field used to ensure that the collision is detected by all devices attached to the network. When this sequence is being transmitted to the PHY, care must be taken to be sure the PHY can accept the information. If the PHY indicates that it cannot accept the data (Tx_BC inactive) the state machine goes to the "JAM wait" state. When the jam sequence is complete or a reset is received, the state machine will return to the "IDLE" state.

JAM Wait State

While in the "JAM Wait" state, the state machine is waiting for an indication from the PHY that it can accept more data. Once this indication is received (Tx_BC active) the state machine returns to the "JAM" state where it will continue to transfer the jam sequence and loop until it receives an indication from the PHY that more data can be accepted on the next TDM cycle.

Now turning to the the RxMII which is used to strip the Preamble and Start Frame Delimiter (see FIG. 2) from the Ethernet or token ring frames passed to it by the MUX (18). It is also used to calculate and check the CRC for the received frame. The RxMII passes the Destination address, Source address, Type/Length field, frame payload, and frame CRC to the RxMAC. The IFG is dead time on the network and is thus stripped by the RxMII logic.

The receive interface (RxMII) 22 is coupled to a receive RxMAC 28; a receive state register 30 and the multiplexer 18. The receive interface 22 is used to strip the preamble and Start Frame Delimiter from the frame passed to it by the multiplexer 18. Interface 22 is also used to calculate and check the CRC for the received frame. The interface also passes the destination/length field, frame payload and frame CRC to the RxMAC 28. The IFG portion of the frame is dead time on the network and is stripped by the interface logic. The operation of the interface 22 is described in a state diagram shown in FIG. 4.

Figure 4:
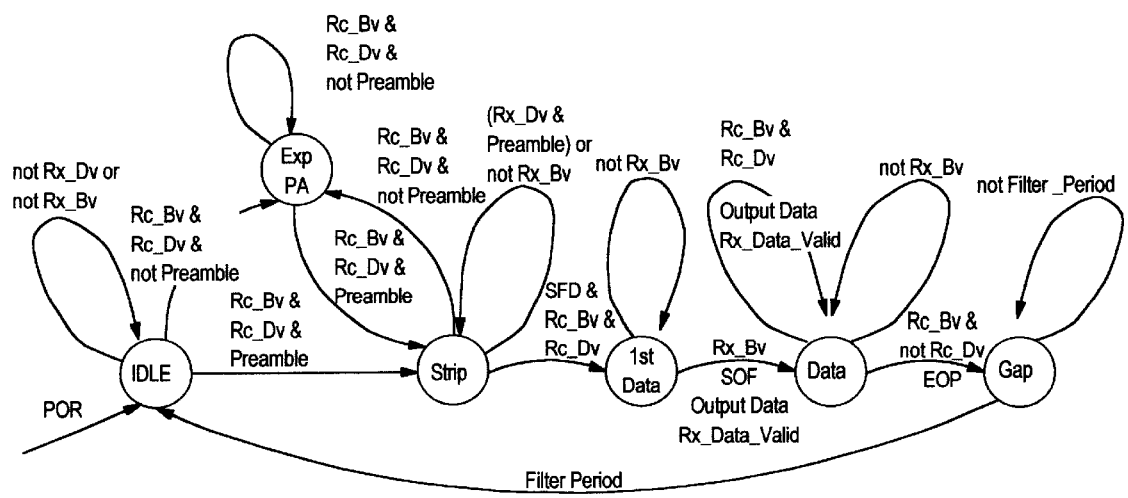
FIG. 4 is a state diagram of a receive media independent interface (RxMII) included in the multi-port adapter of FIG. 1.

FIG. 4 contains the state diagram for the RxMII logic. In this logic the following signals are received from the multiplexer 18. Rx_BV is a signal that when active indicates that the information transferred during the current TDM cycle is valid. Rx_DV is a signal from the multiplexer 18 that envelopes the received frame, becoming active when the PHY detects the preamble and remains active until the PHY detects the end of the frame. SOF (Start Of Frame) is an output signal indicating the first byte of the destination address is being received. EOF (End Of Frame) is an output signal that becomes active after the last byte of the CRC has been received. Preamble is a signal that is decoded by the RxMII logic and indicates that a hex AA is being received from the PHY. The following state diagram describes the function of the RxMII.

RxMII Operation

The RxMII state machine flow controls the logic used to accept frames received from the media and transferred from the PHY layer to the MAC logic. The state machine is used to strip the Preamble, search for the SFD to establish byte sync and then strip the SFD, and accept the frame payload.

IDLE State

The machine is put into the "IDLE" state when a power-on-reset (POR) is received. In this state, the machine is waiting for PHY to receive a frame. Two signals from the PHY are required to start the receive process. The first signal is Rx_DV. This signal indicates that a frame is being received by the PHY. The Rx_DV (received data valid) signal becomes active when the PHY detects the preamble and remains active until the end of the frame is detected at the PHY. The second signal is the Rx_BV (receive byte valid). This signal indicates that the information received during this TDM cycle is valid. If both of these signals are active and the state machine detects that preamble is being received, the state machine will transition to state "STRIP". If the preamble is not being received, the state machine will go to state "Exp PA" (expect preamble).

Exp PA State

This state is entered when the signals Rx_DV and Rx_BV are both active and the data from the PHY is not a byte of the preamble. The state machine will remain in this state until a Preamble byte is received or (not shown in diagram) a Reset is detected. When in this state, if a preamble byte is received indicating that the preamble is being decoded, the state machine will go to state "STRIP" to remove the preamble. The preamble is not needed and is not stored in the RxFIFO.

STRIP State

The "STRIP" state is used to remove the preamble from the received frame before storing the frame in the receive FIFO. Once in this state, if a non-preamble byte is received the state machine returns to state "Exp PA" and waits for more preamble bytes to be received. If the signal Rx_BV is inactive during the TDM slot, the state machine stays in the "STRIP" state ignoring the data. When the SFD is detected, and both Rx_DV and Rx_BV are active, the state machine continues to state "1st Data".

1st Data State

If Rx_BV is not active during this state, the state machine loops. When both Rx_DV and Rx_BV are active, the PHY has valid data to transfer to the RxFIFO. The state machine will indicate that this is the first byte of the frame by asserting SOF (start of frame), asserting Rx_Data_Valid, and outputting the received data to the FIFO logic. Rx_Data_Valid is a signal used to indicate the presence of valid received data.

Data State

This state is where the state machine receives all of the frame except the first byte. While in this state, if the signal Rx_BV is not active, no data is transferred and the state machine loops. If both Rx_BV and RxVD are asserted, the received data byte is transferred to the RxFIFO where the received frame or partial frame is being temporarily stored. The state machine will continue to loop in this state until the complete frame has been received. The end of the frame is signaled by the PHY by deasserting the Rx_DV signal. When the RxMII detects the deasserted Rx_DV while Rx$_{13}$ BV is asserted it will transfer the last byte of data to the RxFIFO and assert the EOF (end of frame) indication. At this point the state machine advances to the "GAP" state.

GAP State

The "GAP" state is used to place the MAC logic in a state where it will not attempt to receive another frame for at least four clock cycles after the previous frame is received. The signal "Filter_Period" is generated by a counter and counts from zero to three. After the four cycles have elapsed, the state machine returns to the "IDLE" state where it is ready to receive the next frame.

Returning to FIG. 1, the receive RxMAC 28 parses a received frame into its constituent parts and directs those parts to the appropriate logic. The state machine 30 generates the RxFIFO addresses and writes the data from the interface 22 into the FIFO. When the interface 22 has data from the multiplexer 18, it signals the RxMac 28 that a byte of data has been received. The RxMac 28 then writes the data byte into the FIFO 42 using the address obtained from the appropriate state register 30; calculates the address where the next data byte will be stored and writes this address back into the state register 30. The RxMac also places status in the state register indicating the start of frame (SOF) and end of frame (EOF).

In the transmit direction, frames are removed from a transmit FIFO 40 by the MAC 24 and sent to the appropriate port via the interface 20 and the multiplexer 18. The state machine 26 generates the FIFO 40 addresses; reads the data from the FIFO 40 and communicates with the interface 20 supplying data when required.

The operation of the state machines 26 and 30 is described in the state diagrams shown in FIGS. 5 and 6, as follows:

The purpose of the TxMAC is to remove data from the TxFIFO and present it to the TxMII interface logic so that it can be transmitted to the media. While removing the data from the FIFO it must remember the FIFO address of where the next data byte will be removed and, in case of a media collision, the TxMAC must be able to either end the frame (Late Collision) or retransmit the frame from the beginning. A description of the TxMAC state machine follows.

TxMAC State Machine Operation

IDLE State

Figure 5:
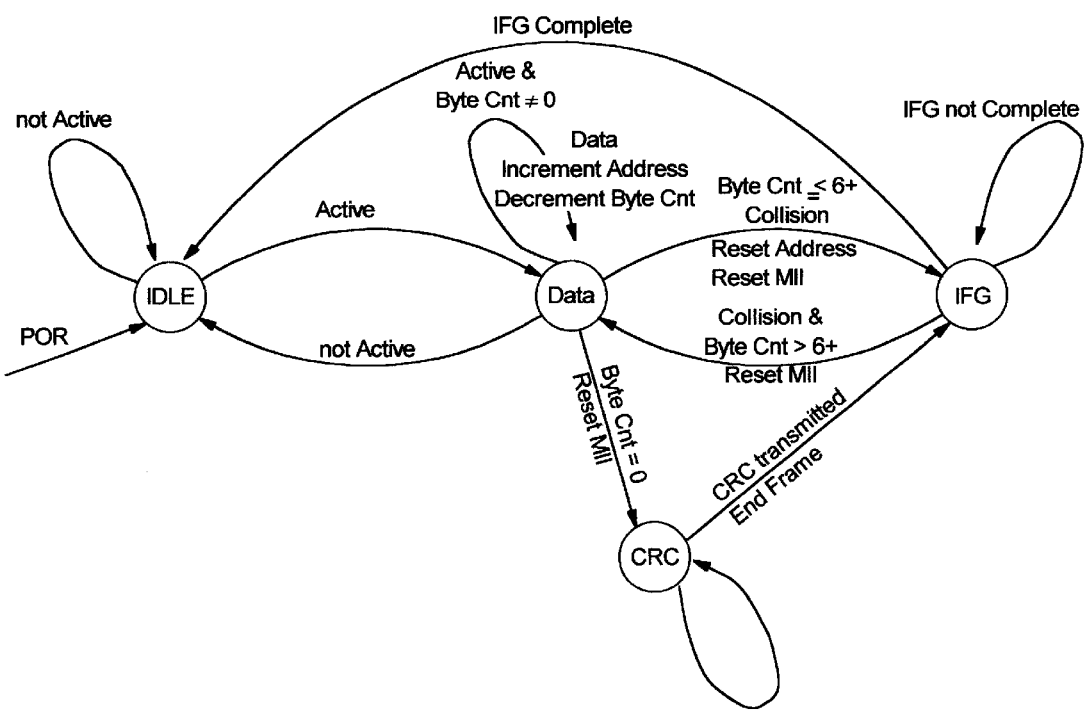
FIG. 5 is a state diagram of a transmit MAC state machine (TxMAC) included in the multi-port adapter of FIG. 1.

FIG. 5 is a state diagram of a typical TxMAC. The state machine is placed into the "IDLE" state when it receives a Power-on_Reset (POR). When the Control Logic 34 detects that a frame or partial frame is in the TxFIFO, it will notify the TxMAC to start the transmission of this frame by asserting the "Active" signal. Until the "Active" signal is received, the TxMAC state machine remains in the "IDLE" state. When the "Active" signal is received, the state machine goes to the "DATA" state.

DATA State

The "DATA" state is the state where data is taken from the TxFIFO and sent to the media. When the Control Logic 34 starts a transmit operation, it provides the TxMAC with the frame byte count. This byte count is used to determine when the complete frame has been transmitted. If the byte count is not equal to zero and the transmit is "active", the data byte that has been removed from the TxFIFO is presented to the TxMII for transmission. The TxFIFO data address is incremented, and the byte count is decremented. Both are placed back into the Transmit state register 26 until this port is serviced again.

When the byte count is equal to zero, a Reset to the TxMII is asserted. This will notify the TxMII that the complete frame has been sent and the CRC should be appended to the frame. The state machine will go to the "CRC" state to transfer the CRC to the TxMII logic.

If a collision is detected on the media, the byte count is checked to determine if the collision is an "Early" collision. If the byte count is 64 or less, the collision is early and transmission of the frame is stopped with a JAM sequence. The TxFIFO address is returned to the beginning of the frame and the state machine goes to state "IFG" to produce the Interframe Gap. The indication that a frame is in the TxFIFO remains set and the frame will be retransmitted when the IFG expires. If the byte count is greater than 64 when the collision occurs, the TxMII logic is instructed to send the JAM sequence and stop the frame transmission. The Control Logic 34 is instructed that the frame has been transmitted. The frame is not retransmitted.

CRC State

This state is entered after all of the frame data has been transmitted, indicated by a byte count of zero. The CRC is four bytes in length and the state machine will remain in the "CRC" state until all four bytes of the CRC have been sent to the TxMII logic. When all four bytes of the CRC have been sent, the state machine will go to the IFG state.

Interframe Gap (IFG) State

The IEEE Standards for Ethernet requires a gap or dead time between frames. This IFG is assured by placing the TxMAC state machine in the "IFG" state after each frame has been transmitted or terminated as a result of a collision. When leaving the "IFG" state, the state machine returns to the "IDLE" state where it is ready to transmit another frame.

RxMAC State Machine Operation

Figure 6:
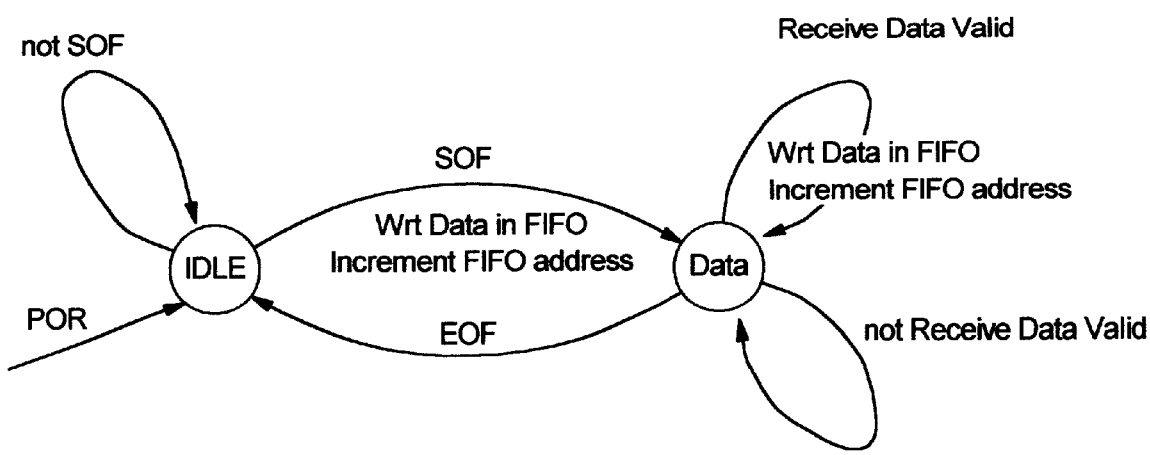
FIG. 6 is a representation of a receive MAC state machine (RxMAC) included in the multi-port adapter of FIG. 1.

Shown in FIG. 6 is a state diagram for a typical RxMAC state machine implementation. This state machine is responsible for moving data given to it by the RxMII state machine and placing that data in the RxFIFO. It also provides a start of frame (SOF) and end of frame (EOF) indication to the FIFO as well as logic to increment the RxFIFO address pointer. A description of this state machine follows.

IDLE State

The RxMAC state machine returns to the IDLE state whenever it detects a power-on-reset (POR) signal. The POR path from the "DATA" state to the "IDLE" state is not shown in the figure in an attempt to simplify the diagram.

In the "IDLE" state the RxMAC is waiting for an indication that a frame is being received by the RxMII logic. When the RxMII logic starts to receive a frame it will assert SOF (start of frame). Detection of SOF by the RxMAC will produce a transition from the "IDLE" state to the "DATA" state. During this transition, the received data byte is written in the RxFIFO and the FIFO address is incremented. It is possible to design the RxMAC logic in such a way that multiple data bytes are written into the RxFIFO with each write operation and the address incremented accordingly. This may be necessary when designing for high speed networks.

DATA State

While in the "DATA" state, the RxMAC checks the "receive data valid" signal from the RxMII logic. If this signal is asserted, data is available to be written into the RxFIFO. The RxMAC writes the received data into the FIFO and increments the FIFO address. Once again it is assumed that additional logic is keeping track of FIFO addresses and managing the FIFO overruns, etc.

The "DATA" state also monitors the EOF (end of frame) signal. When EOF is asserted the end of the frame has been detected by the RxMII logic. The RxMAC state machine will transition back to the "IDLE" state and wait to receive the SOF for the next frame.

Figure 7:
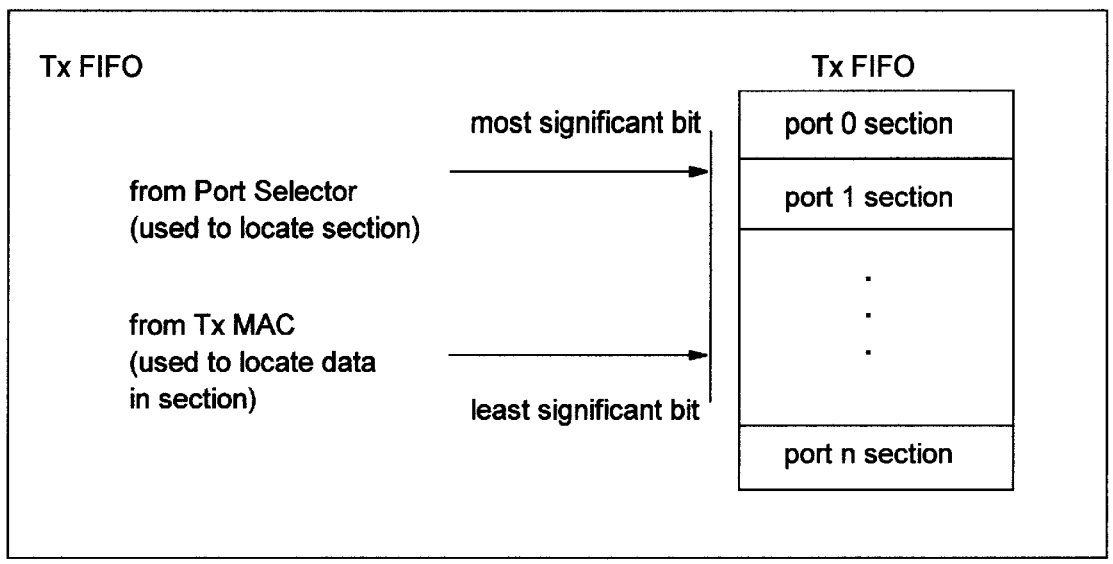
FIG. 7 is a representation of a transmit FIFO (TxFIFO) included in the multi-port adapter of FIG. 1.
Figure 8:
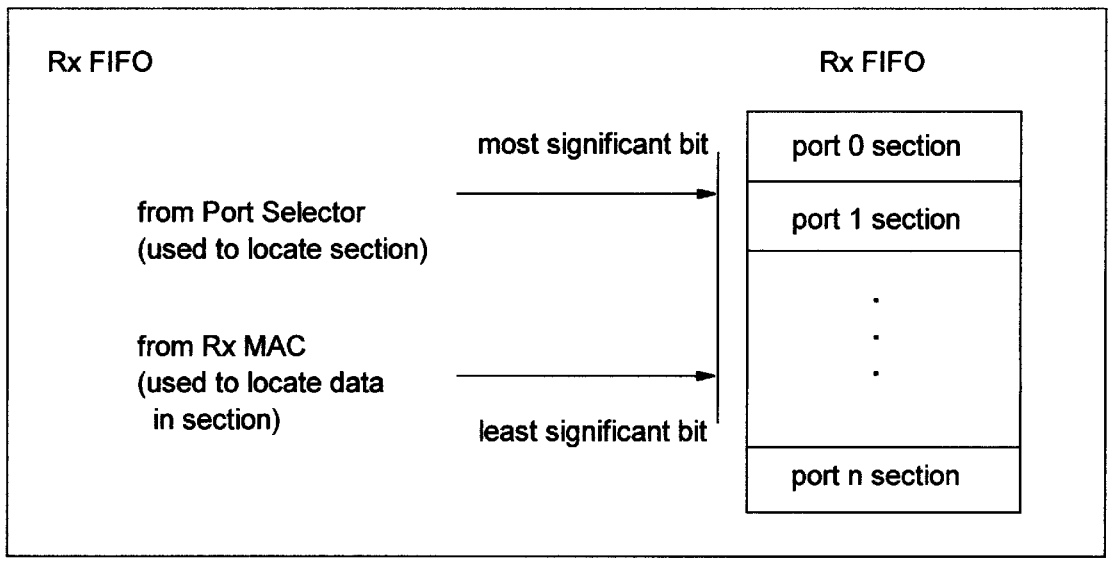
FIG. 8 is a representation of a receive FIFO (RxFIFO) included in the multi-port adapter of FIG. 1.

The transmit FIFO 40 stores frames or partial frames before being transmitted. The FIFO 40 is logically divided into one section per port as shown in FIG. 7. Thus, if there were 10 ports served by the MAC and the FIFO 40 was a 1000 bytes total, the FIFO would be divided into ten equal sections of 100 bytes each. Likewise, the receive FIFO 43 is used to hold frames or partial frames if they are received from the media. The structure of the receive FIFO 43 is shown in FIG. 8.

The receive FIFO 43 is used to hold frames or partial frames as they are received from the media. The RxMac writes the frames into the RxFIFO by generating a section address while a port selector 46 (described hereinafter) generates the address within the section, as shown in FIG. 8. The reading of data from the TxFIFO and the writing of data into the RxFIFO is synchronized and controlled by the scanning process of the port selector.

The port selector 46 is coupled to the multiplexer 18 and the state registers 26 and 30. The port selector is a free-running counter whose output selects the current port to logically attach to the MAC. The port selector counts ports minus 1 from 0 to N and wraps back to 0. N is the number of ports minus 1 in the implemented design. For a 10 port design, the port selector would count from 0 to 9 returning to 0 and repeating the sequence. The output of the port selector is used to control the multiplexer 18 and is also used to select one of the transmit state registers 26 and 30. The process of selection of the state registers and selecting the port is synchronous and is controlled by the port selector.

The transmit and receive MACs 24 and 28 communicate with each of the ports 0–N, one at a time, using the time division multiplexer 18 controlled by the port selector 46. The selector 46 selects the ports starting with port 0 and continuing in sequence until the last port has been selected, at which time the sequence is repeated. As each port is selected by the selector 46, the multiplexer 18 logically connects the selected port to the transmit interface 20 and also to the receive interface 22. This logical connection lasts for only one internal clock cycle. During this clock cycle, the multiplexer 18 will process a byte of data received from a selected port and the transmit MAC 24 will send a byte of data to the selected port. During the clock cycle following the data transfer, the next port in sequence will be serviced. If there are 10 ports in the adapter, it is assumed that the transmit MAC and the receive MAC along with their interface logic and multiplexer 18 can function at 10 times data rate of each of the ports. The selector 46 scans the ports such that each port is serviced at a rate equal to or greater than its data rate requires.

Each MAC must process frames received from each of the attached ports. To keep track of the state of each of the ports, each MAC uses the transmit state register 26 and multiplexer 18 for each port and a receive state register 30 and the multiplexer 18 for each port. As the port selector 46 selects a port, the associated transmit and receive state registers are also selected. The transmit state register and multiplexer are used to determine the state of the transmit MAC 24 while the receive state register is used to determine the state of the receive MAC 28 in processing data flowing between the system and the network and vice-a-versa. The contents of the transmit and receive state registers are updated with new state information as each data byte is transferred between the MAC and the port.

Data is passed from the interfaces 20 and 22 to the MAC logic 24 and 28, respectively, via an 8-bit bus. Therefore, for 100 mbps operation, an 8-bit word of data is available every 80 nanoseconds. If the desired number of ports is 10, the internal clock of the chip can be run with 8 nanosecond cycles. The port selector implemented as a cyclic counter ranges from 0 to 9 or can be implemented to select ports based on a priority or service needed algorithm. In each cycle, a different port is selected. The registers containing state information and frame processing status are replicated for each port. The port selector 46 is used to swap in the state information for the appropriate port to allow cycle processing of that port. At the end of the cycle, the registers are set and stay set until selected again. This process repeats for each port. Once data is accumulated in the receive FIFO or space is available on the transmit FIFO, control information is presented to control logic 34 serving both ports. The control logic will then read or write data from the appropriate FIFO partition to or from the host or network, as the case may be.

Control information is provided by the TxFIFO and the RxFIFO to Control logic 34 to move data from the host system 12 via host bus 14 and host interface 16 to the TxFIFO, once space is available and transfer data from the RxFIFO to the host system 12, once data is accumulated.

Figure 9:
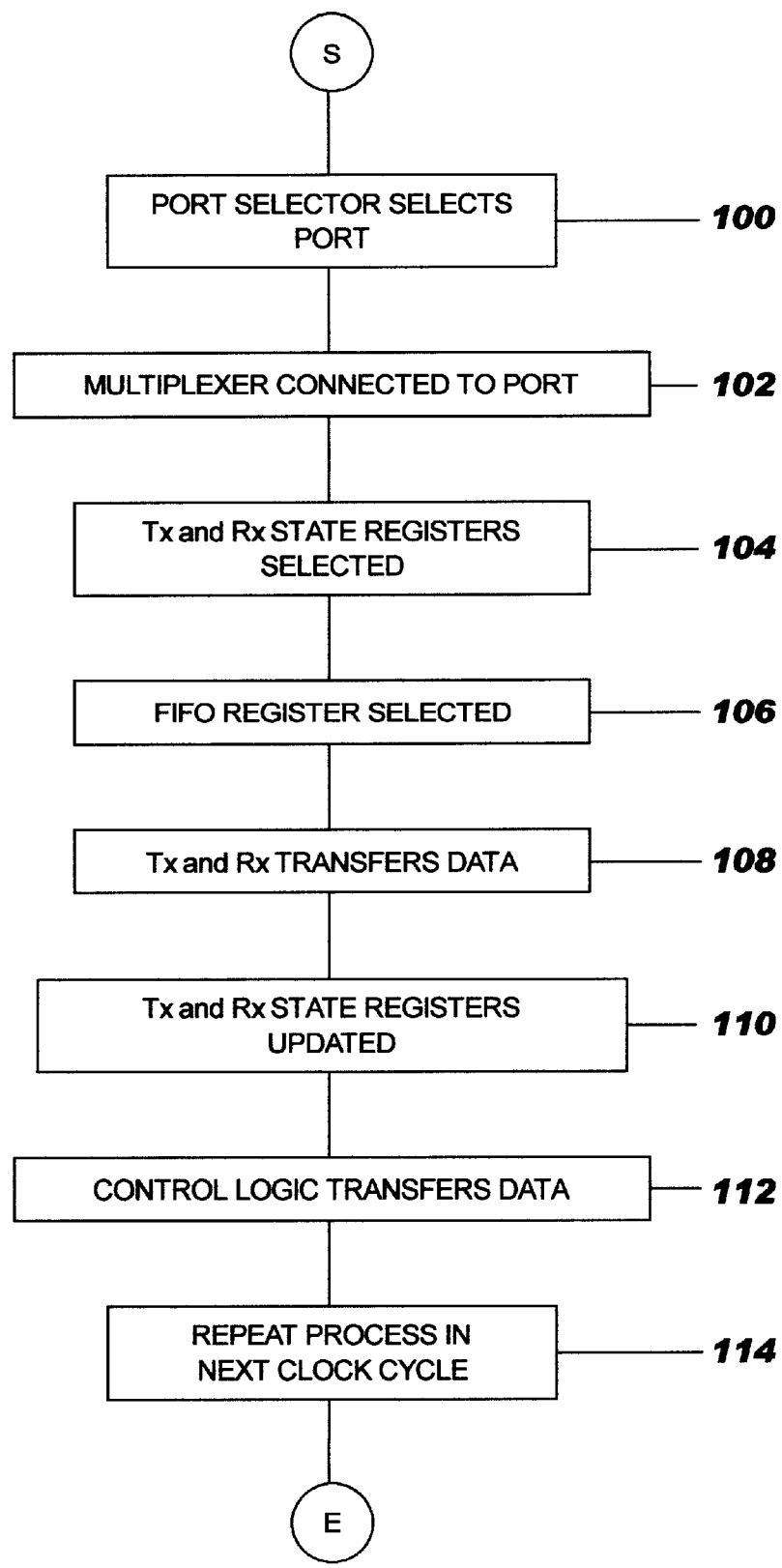
FIG. 9 is a flow diagram of a receive and a transmit operation in the system of FIG. 1.

In FIG. 9, the single MAC operation with a single I/O output begins in a step 100 in which during a system clock cycle, the port selector selects a port $20^0 \ldots 20^n$ to transfer data between the host system and the network on a TDM basis. In a step 102, the port selector connects the multiplexer 18 to the selected port and through the single I/O 13 to the Tx interface 20 and the Rx interface 22 during the clock cycle. The Tx interface 20 transmits the preamble and start frame delimiter; calculates the frame CRC and signals any errors to the physical layer 15 through the single I/O port 13. The Rx interface 22 strips the preamble and start frame delimiter from the frame received from the multiplexer through the single I/O port 13. The Rx interface calculates and checks the CRC for the received frame and passes the destination address, source address, type/length field, frame payload and frame CRC to the RxMAC.

Simultaneously, the port selector selects the Tx and Rx state register for the selected port in a step 104. The state registers determine the state of the Tx and RxMACs for processing data.

In a step 106, the port selector selects the section of the Tx and RxFIFO's to move data out of or store data in, respectively.

In step 108, the RxMAC will process the data byte from the single I/O port after the Rx interface signals the RxMACs that a data byte has been received. The RxMAC writes the data byte into the RxFIFO using the address obtained from the appropriate Rx state register; calculates the address where the next data byte will be stored; and writes this address back into the register. The RxMAC also places status in the state register indicating the start of the frame and end of a frame. The TxMAC transfers data from the TxFIFO to the Tx interface. The Tx state machine generates the TxFIFO address to read data for transfer to the Tx interface.

In a step 110, the Rx and TxMAC update the Rx and Tx state registers with new state information as each data byte is transferred between the MAC and the port for successive clock cycles.

In a step 112, control information is provided by the TxFIFO and an RxFIFO to the control logic, whereupon data is transferred from the RxFIFO to the host system and data is loaded into the TxFIFO from the host system in the sections identified by the port selector and the addresses within the section specified by the Rx or TxMAC, as the case may be.

The process is repeated in step 114 for the next clock cycle during which the port selector identifies the port for the transfer of data.

Summarizing, the present invention describes a multiple port adapter having a single MAC with a single I/O port coupled to a multiplexer in a physical layer serving multiple channels in a TDM communication network through multiple ports 0 . . . N. The MAC has a receive path and a transmit path for processing TDM frames after preliminary processing by a transmit and receive interface, respectively. A port selector selects a register of a state machine for determining the state of the MAC to process data from a selected port. The state machine also identifies a section of a transmit and receive FIFO for storing data in or moving data to the network. The MAC units write the specific address of the data in the FIFO's. Control information is provided by the FIFO's to control logic to transfer data from the receive FIFO to the host system once data is accumulated and transfer data from the transmit FIFO to the network once space is available in the FIFO. The single MAC reduces the circuit count for the adapter as compared to prior art devices using multiple MACs for transferring data. The single MAC having a single I/O port reduces both circuit count and I/O pins.

While the invention has been shown and described in conjunction with a preferred embodiment, various changes may be made in form and substance without departing from the spirit and scope of the invention as defined in the appended claims, in which:

We claim:

1. A multiple port adapter coupled to a communication network and a host system, comprising:
    a) a single Media Access Control (MAC) coupled between the host system and through a single I/O port to multiple ports serving individual channels of the network;
    b) a state machine coupled to the MAC for tracking the state of each port in the transfer of data on a time divided multiplex (TDM) basis; and
    c) selector means coupled to the state machine and the multiple ports for selecting each port on a cycle basis to transmit and receive data between the host system and the network through the single MAC.

2. The multiple port adapter of claim 1 further comprising a multiplexer coupled between the multiple ports and the single I/O port of the MAC.

3. The multiple port adapter of claim 1 further comprising storage means coupled between the single MAC and the host system.

4. The multiple port adapter of claim 3 further comprising control logic and a host interface and wherein the storage device provides instructions to the control logic for transmitting and receiving data between the host system and the network.

5. The multiple port adapter of claim 1 further comprising;
means connecting the control logic coupled to a transmit storage device and a receive storage device.

6. The multiple port adapter of claim 1 further comprising;
    interface means coupled between the single MAC and the multiple ports.

7. The multiple port adapter of claim 6 wherein the interface transmits a frame including a Preamble and Start Frame Delimiter; calculates a frame Cyclic Redundancy Check (CRC) and signals errors to a Physical Layer coupled to a port.

8. The multiple port adapter of claim 6 wherein the interface strips a Preamble and Start Frame Delimiter; calculates and check a CRC for a received frame and passes a Destination address, Source address, Type/Length field, frame payload, and frame CRC to the MAC.

9. The multiple port adapter of claim 1 further comprising;
    a transmit path and a receive MAC path in the single MAC, each path coupled through the single I/O port to a multiplexer and at the other end to separate transmit and receive storage devices.

10. The multiple port adapter of claim 1 wherein the single MAC comprises a transmit MAC and a receive MAC path.

11. The multiple port adapter of claim 1 wherein the state machine comprises a transmit state machine and a receive state machine coupled to the single MAC and to the selector means.

12. The multiple port adapter of claim 11 wherein the transmit and receive state machines operate concurrently and determine the MAC state for servicing a port, after which the MAC state is updated and stored back into a state table.

13. The multiple port adapter of claim 1 wherein the selector is coupled through the single I/O port to a multiplexer and to the state machines for selecting each port on a cycle basis to transmit and receive data between the host system and the network and assigns a section in a storage device for storing data processed or to be processed by the MAC.

14. In a communication network coupled to a multiple port adapter, a Media Access Control chip having a single I/O port servicing multiple ports in a Physical Layer for the network whereby chip logic circuits and I/O pins are reduced, comprising:
    a) a transmit MAC and a receive MAC in the Media Access Control chip, each MAC coupled at one end through the single I/O port to a port multiplexer and at the other end to respective transmit and receive storage registers, the port multiplexer being coupled to the network through ports 0 . . . N;
    b) transmit and receive state registers coupled to the transmit and receive MACs for tracking the state of each port in the transfer of data in both directions between a host system and the network;
    c) control logic coupled to the storage registers and a host interface to control the transfer of data between the host system and the storage registers;
    d) a port selector coupled between the multiplexer and the transmit and receive state registers for relating each state register to a port and organizing data in the transmit and receive storage registers on a port basis; and
    e) means for activating the port selector to select a different adapter port on a cyclic basis to transfer data through the single I/O port in both directions and provide the state information for the selected port to allow a cycle of processing for that port through the single port, at the end of which cycle, the state registers are set and stay set until selected again whereupon processing repeats for each port in a cyclic manner.

15. The system of claim 14 further comprising interface means coupled between the receive MAC and between the transmit MAC and through the single I/O port to the multiplexer.

16. The system of claim 15 wherein the interface means are state machines implemented in a plurality of states for transferring data, in both directions through the single I/O port, between the host system and the network.

17. The system of claim 14 wherein the storage device are coupled to a host interface and provides instructions to the control logic for transmitting and receiving data through the single I/O port between the host system and the network.

18. The system of claim 16 wherein the transmit interface transmits a frame including a Preamble and Start Frame Delimiter; calculates a frame Cyclic Redundancy Check (CRC) and signals errors to a Physical Layer coupled to a port.

19. The multiple port adapter of claim 16 wherein the receive interface strips a Preamble and Start Frame Delimiter; calculates and checks a CRC for a received frame and passes a Destination address, Source address, Type/Length field, frame payload, and frame CRC to the MAC.

20. In a communication network coupled to a multiple port adapter, a Media Access Control (MAC) coupled to through single I/O port to a multiplexer for servicing multiple adapter ports on an individual basis, interface means coupled through the single I/O port to the multiplexer and the MAC, a state machine for tracking the transfer of data between a host system and the network, storage means coupled to the host system and the MAC and control logic for transferring data to and from the host system and the storage means, a port selector selecting individual ports on a cycle basis coupled to the multilexer and the state machine, a method for connecting the MAC to each port on an individual basis for the transfer of data, in both directions, through the single I/O port between the host system and the network, comprising the steps of:

a) selecting a port to transfer data between the host system and the network through the single I/O port using the port selector;

b) connecting the selected port to the multiplexer and the interface means in a clock cycle;

c) transmitting a preamble and start frame delimiter in a transmit frame; calculating the frame CRC and signalling any errors in the frame to a physical layer serving the selected port using the interface means;

d) stripping the preamble and start frame delimiter in a received frame; calculating and checking the CRC of the frame, and passing the destination address, source address, type/length field, frame payload to the MAC through the single I/O port using the interface means;

e) selecting the state registers for the selected port using the state machine as instructed by the port selector;

f) selecting the section of the storage device to move data out of or store data in using the port selector;

g) processing data in the MAC device provided by the interface means or the storage means and writing data in and/or reading data out of the storage means;

h) updating the state machine on an individual port basis with regard to the data transferred to the network and to the storage device;

i) providing instruction to the control logic for transferring data to/from the storage device and the host system; and j) repeating steps a)–h) for the next clock cycle.

* * * * *